United States Patent [19]
Baynes et al.

[11] 3,920,393
[45] Nov. 18, 1975

[54] INJECTION MEANS

[75] Inventors: Frederick Baynes, Bowden; David Edward Bowker, Manchester, both of England

[73] Assignee: Dunlop Limited, London, England

[22] Filed: Nov. 27, 1973

[21] Appl. No.: 419,252

[30] Foreign Application Priority Data
Nov. 28, 1972 United Kingdom............... 54833/72

[52] U.S. Cl. .............................. 21/7; 21/63; 21/73; 47/57.5; 117/58
[51] Int. Cl......... B27k 3/08; B27k 3/10; B27k 3/14
[58] Field of Search ................. 21/7, 62, 63, 71, 73; 117/58; 47/57.5

[56] References Cited
UNITED STATES PATENTS

| | | | |
|---|---|---|---|
| 447,668 | 3/1891 | Duryee | 21/73 |
| 1,398,212 | 11/1921 | Wheeler | 21/62 X |
| 2,044,063 | 6/1936 | Dahlberg | 47/57.5 |
| 2,186,118 | 1/1940 | Madison | 21/71 |
| 2,947,111 | 8/1960 | Zobrist | 21/7 X |
| 3,582,260 | 6/1971 | Gersonde et al | 21/71 |

*Primary Examiner*—Morris O. Wolk
*Assistant Examiner*—Arnold Turk
*Attorney, Agent, or Firm*—Stevens, Davis, Miller & Mosher

[57] ABSTRACT

A means of injecting tree trunks with preservative fluids comprises using a flexible conduit which is positioned around the trunk covering a slot cut in the trunk. Pumping means pass the fluid under pressure via an inlet and an outlet in the conduit and into the trunk via the slot. The pressure of fluid in the conduit coupled with the flexibility of the conduit effects a seal between the conduit and the slot thereby preventing escape and loss of the fluid.

11 Claims, 4 Drawing Figures

INJECTION MEANS

This invention relates to an injection means for fluids and in particular to a method and an apparatus suitable for use in the introduction of preservative liquids into timber, for example, into the trunk of a felled tree. However, the invention is not so limited in its application and the introduction of preservative liquid may if desired be carried out prior to felling.

It will be appreciated that it is preferable to introduce the preservative into a tree trunk before the trunk is cut into separate planks since fewer pieces are then involved. It is also preferable that the treatment be carried out immediately after felling to reduce the risk of infection. Furthermore it is desirable that the natural liquids in freshly felled timber be replaced by preservative liquids without an intermediate drying stage, since the replacement can thereby be more easily accomplished. Drying, furthermore, is usually accompanied by shrinkage and may cause splitting or other defects. It is therefore often desirable to impregnate tree trunks with preservative in situ after felling or at a place close to the felling area.

Previously proposed preservative treatments include superficial coating and impregnation under pressure. One method of this latter type involves fitting a cap onto the cut end of a tree trunk and pumping preservative liquid, through valve means in the cap, into the trunk. The preservative liquid drives out the natural liquid and fills the thus vacated cells in the timber. A major obstacle to the efficient use of this method is that of ensuring a pressure-tight seal between the cap and the surface of the tree trunk. A further difficulty is of providing a cap which will accommodate various sizes of tree trunk. Alternatively, a large number of caps of various sizes must be provided.

It has also been proposed to immerse the cut end of a tree trunk in a container of preservative liquid and thereby allow capillary action to draw the liquid into the timber, to replace the natural liquids lost by evaporation. A method of this type is clearly slow and cumbersome.

In one aspect the present invention provides an apparatus for the introduction of preservative liquids into the trunk of a tree comprising a flexible conduit to encircle the trunk of the tree, the conduit having an inlet for connection to pumping means and an outlet for engagement with an incision in the trunk of the tree, the conduit being sufficiently flexible to effect a seal around the incision by pressure of the liquid being pumped through it.

The invention also provides a method of injecting a preservative liquid into the trunk of a tree which comprises pumping the liquid under pressure into a flexible conduit encircling the trunk, the fluid passing into the trunk via an outlet in the conduit and an incision in the trunk, whereby the pressure of the liquid in the conduit effects a seal between the conduit and the incision in the trunk.

The apparatus of the present invention overcomes many of the problems and disadvantages of the prior proposed methods. The invention provides a relatively simple means of introducing liquid preservative under pressure into the trunk of a tree prior to or after felling.

In a preferred embodiment of the invention the outlet of the conduit is of smaller dimensions than the inlet. This helps to ensure that the pressure of liquid within the conduit optimizes the sealing pressure between the conduit and the tree trunk being injected thereby reducing or eliminating the tendency of any injected liquid to escape.

The surface of the conduit which is to contact the tree trunk being injected is preferably provided with a layer of resilient, deformable, low-permeability sponge material. This resilient layer helps to ensure good sealing contact between the conduit and the tree trunk despite any variations and irregularities in the surface of the latter. The sponge material is preferably of the closed-cell type to prevent escape of injected fluid through the sponge. Any closed-cell, rubbery sponge material may be used provided it is sufficiently resilient to be effective as a sealing means. Polychloroprene sponge is particularly preferred.

The flexible conduit may be in the form of a continuous ring or it may be in the form of a finite length of flexible tube sealed at its ends. In the latter case the conduit is wrapped around the tree trunk and its ends are overlapped and secured, e.g. by straps. It will be appreciated that in this latter embodiment the conduit has the advantage of being applicable to tree trunks of a number of different diameters, the limiting factor being of course that the circumference of the trunk must not exceed the effective length of the conduit. The conduit is preferably made from textile-reinforced elastomeric material. Suitable textiles include fabrics made from man-made or synthetic fibers, polyamides and polyesters being preferred, and suitable elastomers are those polymers which are resistant to the preservative fluid being used and have, at the same time, satisfactory abrasion resistance. A particularly preferred elastomer is polychloroprene.

The invention is now further described with reference to the accompanying drawings in which.

Figure 1:
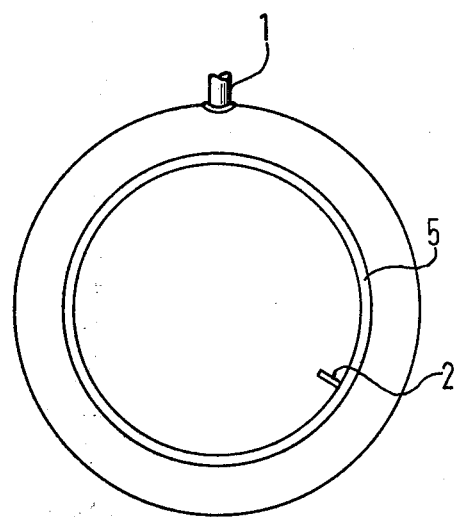
FIG. 1 is a diagrammatic representation of a simple form of injecting means of the invention.

The apparatus of FIG. 1 is a flexible conduit in the form of a textile-reinforced, elastomeric tube, the tube having an inlet 1 which can be connected to a pumping means and an outlet 2 which can be inserted in an incision in a tree trunk. It will be seen that the dimensions of outlet 2 are smaller than those of inlet 1. The inner circumference of the elastomeric tube is provided with a thick layer of resilient, deformable, low permeability sponge material 5.

Figure 2:
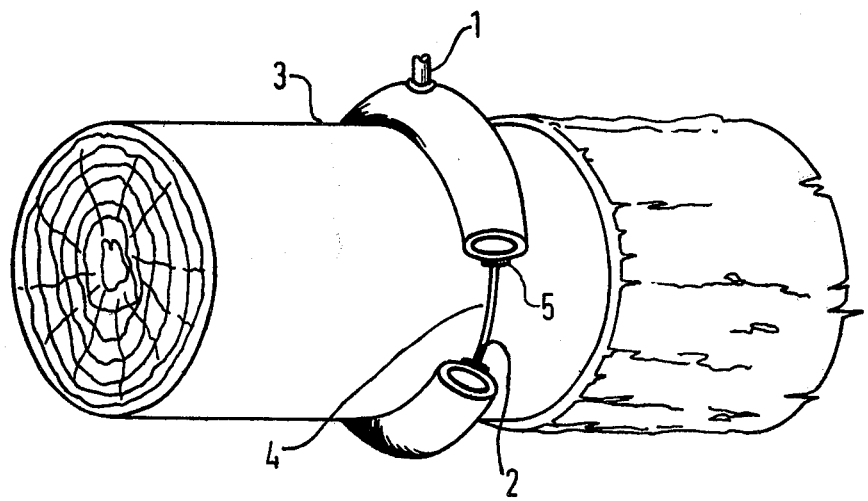
FIG. 2 is a view with parts cut away showing the apparatus of FIG. 1 in position around the trunk of a tree.

In FIG. 2 the elastomeric tube of FIG. 1 is shown in the working position. It is encircling a tree trunk 3 in which has been cut a circumferential slot 4, for example approximately 2 inches deep by ¼ inch wide. The required depth of the slot will vary with the diameter of the tree trunk but should be sufficient to reach the outer layer of the heart wood core. The slot dimensions quoted here have been found suitable for use with a tree trunk of from 6 to 8 inches in diameter.

Outlet 2 of the elastomeric tube is located within the slot 4 and inlet 1 of the tube is connected to a pumping means (not shown). Preservative liquid enters the elastomeric tube under pressure causing its inner circumference to contract and thereby forces the sponge layer 5 into a sealing relationship with the circumferential slot 4. Excess liquid leaves the tube via the outlet 2 and enters and fills the circumferential slot. The pressure is maintained and the preservative liquid is forced into the wood, driving out the natural liquids and occupying the voids thus created.

Figure 3:
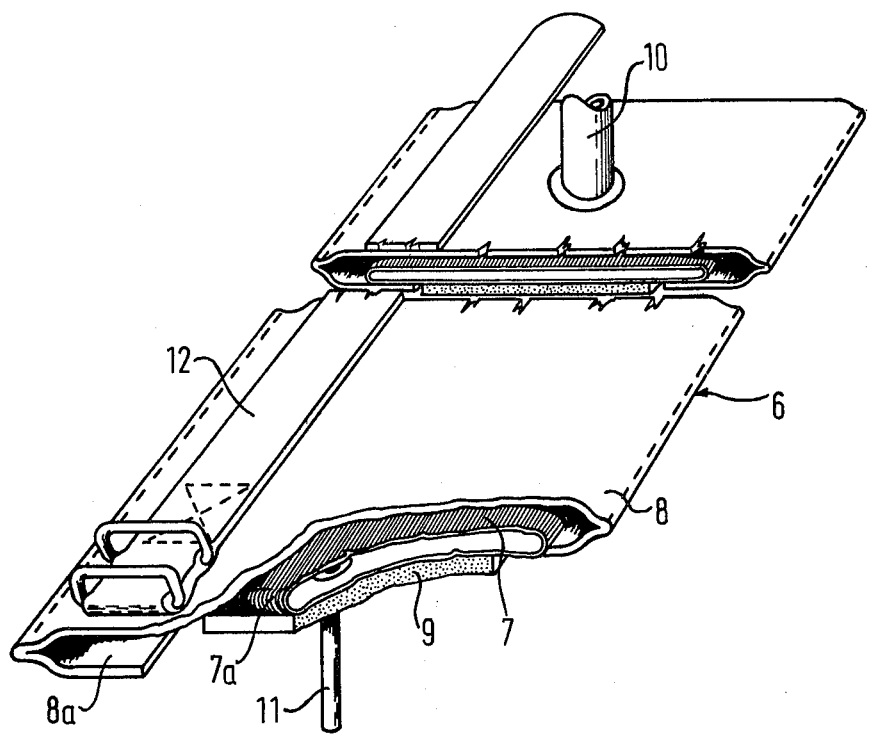
FIG. 3 shows a portion with parts cut away of another form of injecting means of the invention.
Figure 4:
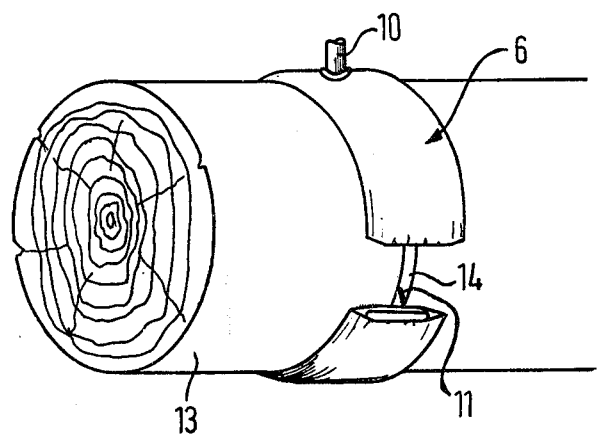
FIG. 4 is a view with parts cut away of the apparatus of FIG. 3 in position around a tree trunk.

The apparatus of FIG. 3 comprises a finite length of elastomeric tubing 6 which is provided with restraining and reinforcing means. The apparatus has an inner tube 7 made from a polychloroprene-coated nylon fabric, the tube being sealed at its ends 7a. It is provided with an outer protective cover 8, made of a heavier nylon fabric with a heavier-duty polychloroprene coating to provide a more robust material. This cover is adhesively attached to the upper surface of tube 7. Cover 8 is wide enough to cover the width of the tube 7 (even when the latter is expanded under pressure of liquid pumped through it) and to leave margins outside the width of tube 7 for the webbing straps described below. In a preferred embodiment, and as shown in FIGS. 3 and 4, the outer cover 8 may be turned back on itself to provide a lip 8a at each longitudinal edge. The lips give additional restraining means to the expansion of the inner tube 7 under pressure.

A strip of sponge material 9 of the type discussed above is adhered to the surface of tube 7 that is to contact the tree trunk. The apparatus is provided with inlet and outlet pipes 10 and 11 respectively. The apparatus is further provided with a number of webbing straps attached, as indicated above along the margin of the outer cover 8. The overall length of each strap is the same and is greater than the overall length of the outer cover. For clarity, only, one strap 12 is shown but normally a strap will be provided along each longitudinal margin of the cover.

The apparatus of FIG. 3 is shown in its working position in FIG. 4. The tube 6 encircles a tree trunk 13 and the two ends of the tube are overlapped and the assembly is held in position by webbing straps 12 (not shown in FIG. 4). Outlet 11 of the tube is inserted in a circumferential slot 14 made in the tree trunk and inlet 10 is connected to a pumping means. The tube becomes inflated under pressure of preservative liquid which is pumped into it and thereby exerts a sealing action between the sponge strip 9 and the slot 14. Moreover, the lips or edges 8a of the protective cover 8 of the tube become trapped beneath the tube thereby restricting transverse expansion. Radial expansion of the tube is restricted by circumferential webbing straps (again not shown).

One method of using the apparatus of the invention is as follows.

Immediately after felling, a tree is roughly dressed by removing its branches and the upper extremity of the trunk. A circumferential slot is made in the trunk near to the cut end and the surrounding bark may be removed. The apparatus is wrapped around the trunk such that the outlet is located within the slot and the slot itself is covered by the sponge strip. The assembly is held in position by strong webbing straps secured by buckles. Preservative liquid, pumped under pressure via the inlet tube, causes the sealing effect discussed above and, as the pressure is maintained, displaces the natural fluids in the wood. Impregnation is deemed to be complete when the preservative liquid emerges from the upper, cut extremity of the trunk.

In carrying out tests with the apparatus of FIG. 3, it was found that the pressure could be raised to 140 pounds per square inch. At this pressure complete sap displacement of a 6 foot length of freshly felled Sitka spruce was effected in about 15 minutes.

It will be apparent that the apparatus can also be used prior to felling. In such event, a tree is roughly dressed and topped and the circumferential slot is cut at a suitable position. The apparatus is then applied as described above and impregnation is carried out. When convenient, the tree may then be felled by further cutting through the slot.

Having now described our invention, what we claim is:

1. An apparatus for the introduction of preservative liquids into the trunk of a tree which comprises a closed flexible conduit to encircle the trunk of the tree, said conduit having an inlet for connection to pumping means for said liquid and an outlet for engagement, when encircling the trunk of a tree, with an incision in the trunk of the tree, said conduit being sufficiently flexible so that when it encircles the trunk of the tree it effects a seal between itself and said incision by pressure of the liquid being pumped through it.

2. An apparatus according to claim 1, in which the outlet of said conduit is of smaller dimensions than the inlet.

3. An apparatus according to claim 1 in which the surface of said conduit which is to contact the tree trunk has a layer of resilient, deformable, low-permeability sponge material.

4. An apparatus according to claim 3 in which said sponge material is closed-cell.

5. An apparatus according to claim 4, in which the sponge material is polychloroprene sponge.

6. An apparatus according to claim 1, in which said flexible conduit is in the form of a continuous ring.

7. An apparatus according to claim 1, in which said flexible conduit is in the form of a finite length of flexible tube whose ends are to be overlapped and secured together.

8. An apparatus according to claim 7, in which said conduit is in the form of an inner tube with sealed ends, said inner tube having an outer protective cover.

9. An apparatus according to claim 8, in which said inner tube is of polychloroprene-coated nylon fabric.

10. A method of injecting a preservative liquid into the trunk of a tree, which comprises cutting an incision in said trunk, wrapping a flexible conduit around said trunk so that an outlet in the conduit fits into said incision in the trunk and pumping liquid through said conduit and into the trunk, whereby the pressure of the liquid in the conduit effects a seal between the conduit and the incision in the trunk.

11. A method according to claim 10, in which said conduit is in the form of a finite length of flexible tube which is wrapped around the trunk and its ends are overlapped and secured.

* * * * *